United States Patent
Du et al.

(10) Patent No.: US 12,238,536 B2
(45) Date of Patent: Feb. 25, 2025

(54) METHOD FOR CONFIGURING RADIO UNITS IN HIERARCHICAL NETWORK AND ELECTRONIC DEVICE USING THE SAME

(71) Applicant: Industrial Technology Research Institute, Hsinchu (TW)

(72) Inventors: Guan-Hsien Du, Hsinchu (TW); Pi-Chen Chiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 412 days.

(21) Appl. No.: 17/863,405

(22) Filed: Jul. 13, 2022

(65) Prior Publication Data

US 2024/0022920 A1    Jan. 18, 2024

(51) Int. Cl.
*H04W 16/24* (2009.01)
(52) U.S. Cl.
CPC .................. *H04W 16/24* (2013.01)
(58) Field of Classification Search
CPC .................................................... H04W 16/24
See application file for complete search history.

(56) References Cited

U.S. PATENT DOCUMENTS

| | | |
|---|---|---|
| 8,554,224 B2 | 10/2013 | Soliman et al. |
| 9,008,717 B2 | 4/2015 | Yu et al. |
| 9,031,530 B2 | 5/2015 | Awoniyi et al. |
| 9,398,528 B2 | 7/2016 | Zhong et al. |
| 9,503,972 B2 | 11/2016 | Zhang et al. |
| 10,645,646 B2 | 5/2020 | Wu et al. |
| 2010/0130212 A1 | 5/2010 | So et al. |
| 2014/0254634 A1 | 9/2014 | Hsu et al. |

(Continued)

FOREIGN PATENT DOCUMENTS

| | | |
|---|---|---|
| CN | 113574938 | 10/2021 |
| EP | 2826275 | 7/2018 |

(Continued)

OTHER PUBLICATIONS

Jingjin Wu et al., "Power Consumption and GoS Tradeoff in Cellular Mobile Networks with Base Station Sleeping and Related Performance Studies", IEEE Transactions on Green Communications and Networking vol. 4, No. 4, Dec. 2020, pp. 1024-1036.

(Continued)

*Primary Examiner* — Samina F Choudhry
(74) *Attorney, Agent, or Firm* — JCIPRNET (57) ABSTRACT

A method and an electronic device for configuring radio units in a hierarchical network are provided. The method includes: obtaining information of a first coverage radio unit, a second coverage radio unit, and a first capacity radio unit belonging to the first coverage radio unit, wherein the information comprising a coverage of the second coverage radio unit and a coverage of the first capacity radio unit; configuring a bandwidth of the first capacity radio unit such that the bandwidth of the first capacity radio unit is not overlapped with the bandwidth of the first coverage radio unit; and reducing a power of the first capacity radio unit in response to the coverage of the first capacity radio unit being overlapped with the coverage of the second coverage radio unit and the bandwidth of the first capacity radio unit being overlapped with the bandwidth of the second coverage radio unit.

15 Claims, 10 Drawing Sheets

(56) References Cited

U.S. PATENT DOCUMENTS

| | | | |
|---|---|---|---|
| 2014/0349700 | A1 | 11/2014 | Sheu et al. |
| 2015/0382290 | A1 | 12/2015 | Yaacoub |
| 2016/0174149 | A1* | 6/2016 | Byun .................. H04W 16/24 455/418 |
| 2017/0245185 | A1 | 8/2017 | Chuberre et al. |
| 2018/0248604 | A1 | 8/2018 | Zhang et al. |

FOREIGN PATENT DOCUMENTS

| | | |
|---|---|---|
| TW | 201924388 | 6/2019 |
| WO | 2013013388 | 1/2013 |

OTHER PUBLICATIONS

Narjes Lassoued et al., "Reducing Power Consumption in HetNet Network Using Power Adjustment and Coordinated Multipoint Technique", 2018 32nd International Conference on Advanced Information Networking and Applications Workshops (WAINA), IEEE, May 2018, pp. 539-544.

Garima Chopra et al., "Non-Orthogonal Multiple Access for Ultra-Dense Cellular Networks with Base Station Sleeping", 2020 IEEE 3rd 5G World Forum (5GWF), IEEE, Sep. 2020, pp. 596-601.

Yuchao Zhu et al., "Joint Traffic Prediction and Base Station Sleeping for Energy Saving in Cellular Networks", ICC 2021—IEEE International Conference on Communications, IEEE, Jun. 2021, pp. 1-6.

Qiong Wu et al., "Deep Reinforcement Learning with Spatio-temporal Traffic Forecasting for Data-Driven Base Station Sleep Control", IEEE/ACM Transactions on Networking 29.2 (2021), Jan. 21, 2021, pp. 935-948.

S. Krishna Gowtam Peesapati et al., "An Analytical Energy Performance Evaluation Methodology for 5G Base Stations", 2021 17th International Conference on Wireless and Mobile Computing, Networking and Communications (WiMob), IEEE, Oct. 2021, pp. 169-174.

"Office Action of Taiwan Counterpart Application", issued on Mar. 13, 2023, p.1-p.14.

* cited by examiner

METHOD FOR CONFIGURING RADIO UNITS IN HIERARCHICAL NETWORK AND ELECTRONIC DEVICE USING THE SAME

BACKGROUND

Technical Field

The disclosure related to a method for configuring radio units in a hierarchical network and an electronic device using the same method.

Description of Related Art

The disaggregated radio access network (D-RAN) architecture is applied in the LTE system or 5G NR system. In order to increase the capacity of the network in a field such that the requirement for the traffic during the peak hours can be satisfied. D-RAN architecture may deploy many radio units (RUS) in the field densely. During the non-peak hours, some of the Rus can be turned off for decreasing the power consumption. However, turning off a RU may change the coverage of the network significantly. Accordingly, quality of service (QOS) of the user equipment (UE) in the network (especially the UE in the edge of the network) may be decreased. Although applying cell outage compensation (COC) mechanism or coverage and capacity optimization (CCO) mechanism may improve the QoS of the network when some of the RUs are turned off, these mechanisms may cause problems such as inter cell interference (ICI) and may decrease the efficiency of bandwidth usage of the network.

SUMMARY

The disclosure is directed to a method for configuring radio units in a hierarchical network and an electronic device using the same method.

An electronic device for configuring radio units in a hierarchical network including a transceiver, a storage medium, and a processor. The storage medium stores a plurality of modules. The processor is coupled to the storage medium and the transceiver, wherein the processor accesses and executes the plurality of modules, wherein the plurality of modules including a first module and a second module. The first module obtains information of a plurality of radio units from the hierarchical network via the transceiver, wherein the plurality of radio units including a first coverage radio unit, a second coverage radio unit, and a first capacity radio unit belonging to the first coverage radio unit, wherein the information including a coverage of the second coverage radio unit and a coverage of the first capacity radio unit. The second module configures a bandwidth of the second coverage radio unit such that the bandwidth of the second coverage radio unit is not overlapped with a bandwidth of the first coverage radio unit, and configures a bandwidth of the first capacity radio unit such that the bandwidth of the first capacity radio unit is not overlapped with the bandwidth of the first coverage radio unit, wherein the second module reduce a power of the first capacity radio unit in response to the coverage of the first capacity radio unit being overlapped with the coverage of the second coverage radio unit and the bandwidth of the first capacity radio unit being overlapped with the bandwidth of the second coverage radio unit.

In an embodiment of the disclosure, the bandwidth of the second coverage radio unit is a bandwidth farthest from the bandwidth of the first coverage radio unit in a default bandwidth.

In an embodiment of the disclosure, the second module selects a first radio unit from the plurality of radio units as the first coverage radio unit according to a reference distance of the first radio unit.

In an embodiment of the disclosure, the second module sets a distance between the first radio unit and a second radio unit as the reference distance of the first radio unit in response to the second radio unit being a radio unit nearest to the first radio unit within a coverage of the first radio unit.

In an embodiment of the disclosure, the second module sets a distance between the first radio unit and a second radio unit as the reference distance of the first radio unit in response to the second radio unit being a radio unit farthest from the first radio unit within a coverage of the first radio unit.

In an embodiment of the disclosure, the second module selects a second radio unit from the plurality of radio units as the first capacity radio unit in response to the second radio unit being in the coverage of the first coverage radio unit.

In an embodiment of the disclosure, the information further including traffic of the first coverage unit, wherein the second module configuring a beamforming parameter for the first capacity radio unit via the transceiver in response to the traffic of the first capacity radio unit being greater than a threshold.

In an embodiment of the disclosure, the information further including traffic of the first coverage radio unit, wherein the second module turns on the first capacity radio unit via the transceiver in response to the traffic of the first coverage radio unit being greater than a threshold.

In an embodiment of the disclosure, the plurality of modules further including a third module. The third module configures a user equipment to handover from the first coverage radio unit to the first capacity radio unit via the transceiver in response to the first capacity radio unit being turned on.

In an embodiment of the disclosure, the information further including traffic of the first capacity radio unit, wherein the second module turns off the first capacity radio unit via the transceiver in response to the traffic of the first capacity radio unit being less than or equal to a threshold.

In an embodiment of the disclosure, the first coverage radio unit and the first capacity radio unit are located in the same position.

In an embodiment of the disclosure, the second module configures the first coverage radio unit to perform data transmission for a control plane and a user plane of the hierarchical network.

In an embodiment of the disclosure, the second module configures the first capacity radio unit to perform data transmission for a control plane and a user plane of the hierarchical network.

In an embodiment of the disclosure, the first capacity radio unit supports operation in a single bandwidth.

A method for configuring radio units in a hierarchical network, including: obtaining information of a plurality of radio units from the hierarchical network, wherein the plurality of radio units including a first coverage radio unit, a second coverage radio unit, and a first capacity radio unit belonging to the first coverage radio unit, wherein the information including a coverage of the second coverage radio unit and a coverage of the first capacity radio unit; configuring a bandwidth of the second coverage radio unit such that the bandwidth of the second coverage radio unit is not overlapped with a bandwidth of the first coverage radio unit; configuring a bandwidth of the first capacity radio unit such that the bandwidth of the first capacity radio unit is not overlapped with the bandwidth of the first coverage radio unit; and reducing a power of the first capacity radio unit in response to the coverage of the first capacity radio unit being overlapped with the coverage of the second coverage radio unit and the bandwidth of the first capacity radio unit being overlapped with the bandwidth of the second coverage radio unit.

In summary, the disclosure provides a power saving mechanism for the hierarchical network which can guarantee the signal coverage and QoS of the network regardless the traffic of the network is high or low.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

Figure 1:
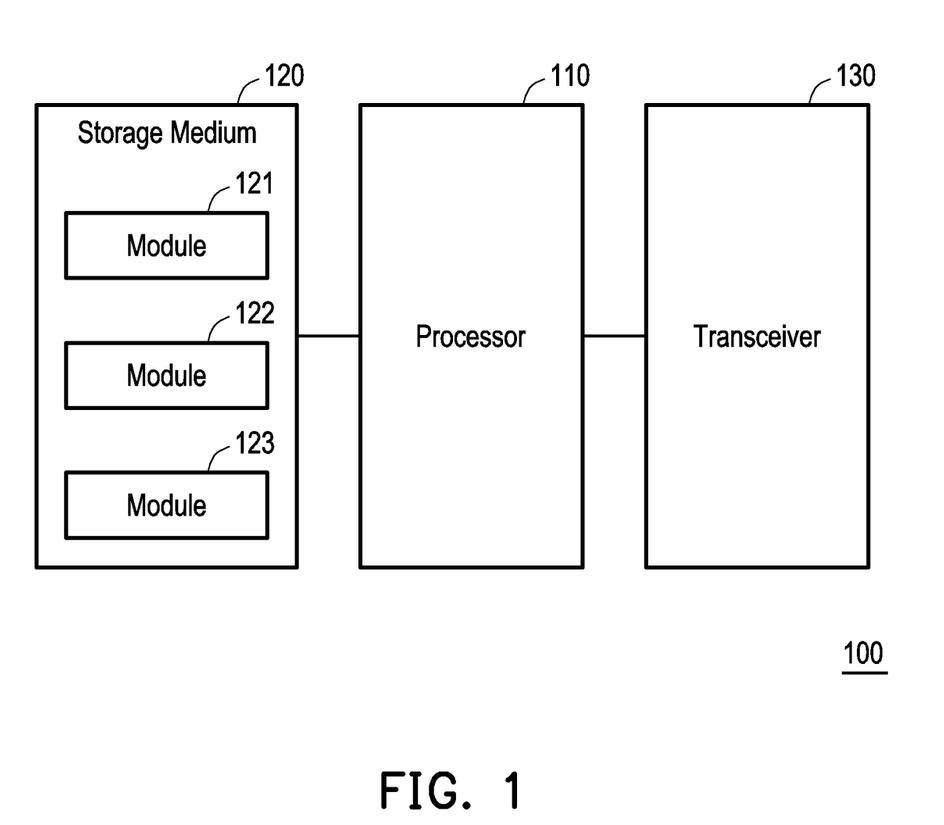
FIG. 1 is a schematic diagram of an electronic device for configuring radio units in a hierarchical network according to one embodiment of the disclosure.

FIG. 1 is a schematic diagram of an electronic device 100 for configuring radio units in a hierarchical network according to one embodiment of the disclosure. The electronic device 100 may include a processor 110, a storage medium 120, and a transceiver 130. The processor 110 is coupled to the storage medium 120 and the transceiver 140 and is configured to access and execute a plurality of modules stored in the storage medium 120. In one embodiment, the electronic device may be a base station such as gNB.

The processor 110 could be implemented by using programmable units such as a micro-processor, a micro-controller, a DSP chip, a field programmable gate array (FPGA), and so forth. The functions of the processor 110 may also implemented with separated electronic devices or ICs.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110, wherein the plurality of modules may include a module 121, a module 122, and a module 123. The module 121 may be used for collecting traffic data of the radio access network. The module 122 may be used for managing power or antenna parameters, deploying the location for the radio unit, distributing the operating frequency and bandwidth for the radio unit, or managing the power saving mode for the radio unit. The module 123 may be used for analyzing the traffic data of a UE in the radio access network or adjusting handover parameters for the radio unit. The functions of the module 121, module 122, and module 123 will be described in detail later.

The transceiver 130 may be configured to transmit or receive signals. The transceiver 130 may also perform operations such as low noise amplifying, impedance matching, frequency mixing, up or down frequency conversion, filtering, amplifying, and so forth. The transceiver 130 may include one or more digital-to-analog (D/A) converters or analog-to-digital (A/D) converters which are configured to convert from an analog signal format to a digital signal format during uplink signal processing and from a digital signal format to an analog signal format during downlink signal processing. The electronic device 100 may communicate with radio units in the hierarchical network via the transceiver 130.

Figure 2:
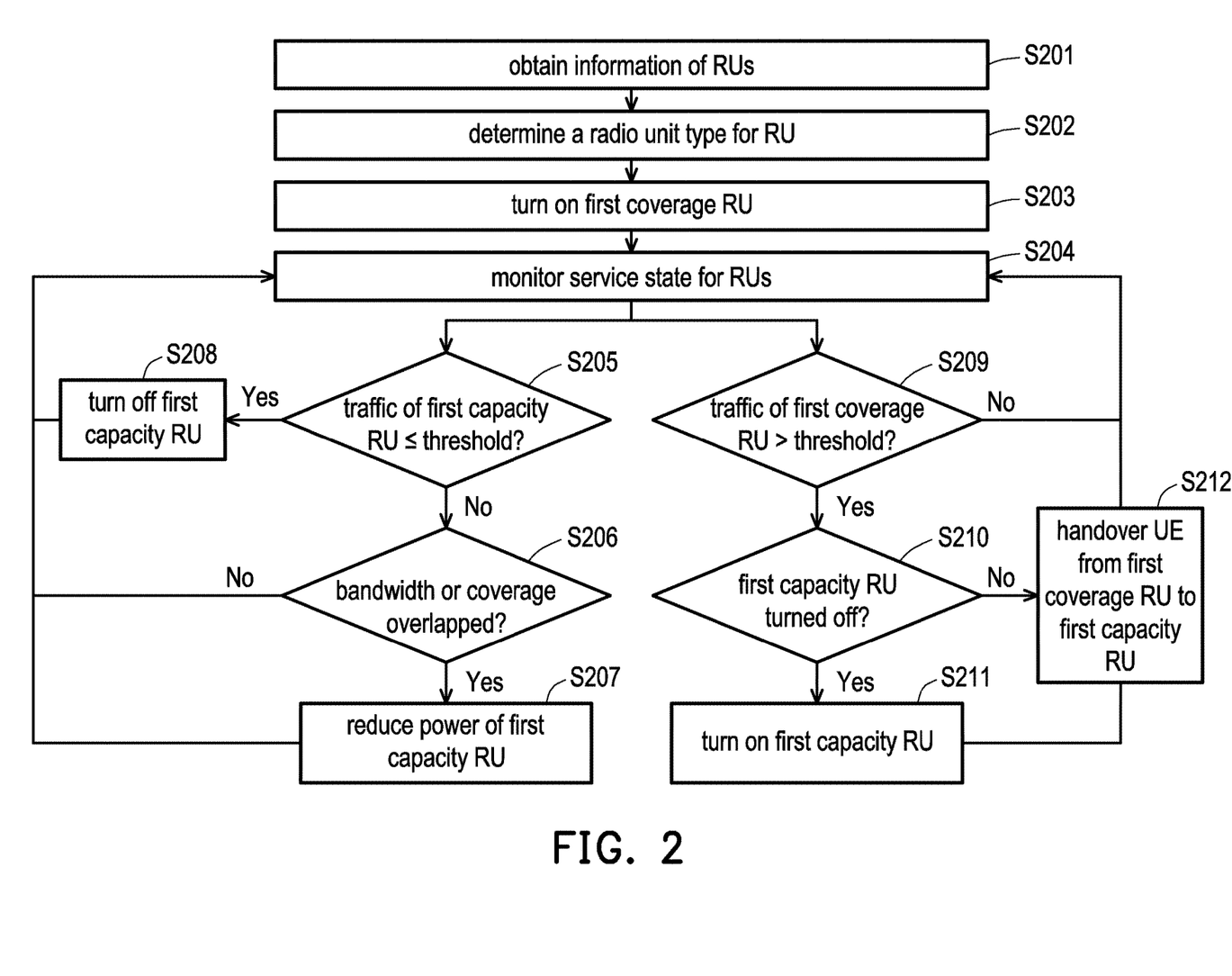
FIG. 2 is a flowchart of a method for configuring radio units in a hierarchical network according to one embodiment of the disclosure.

FIG. 2 is a flowchart of a method for configuring radio units in a hierarchical network according to one embodiment of the disclosure, wherein the method can be implemented by the electronic device 100 as shown in FIG. 1.

Figure 3A:
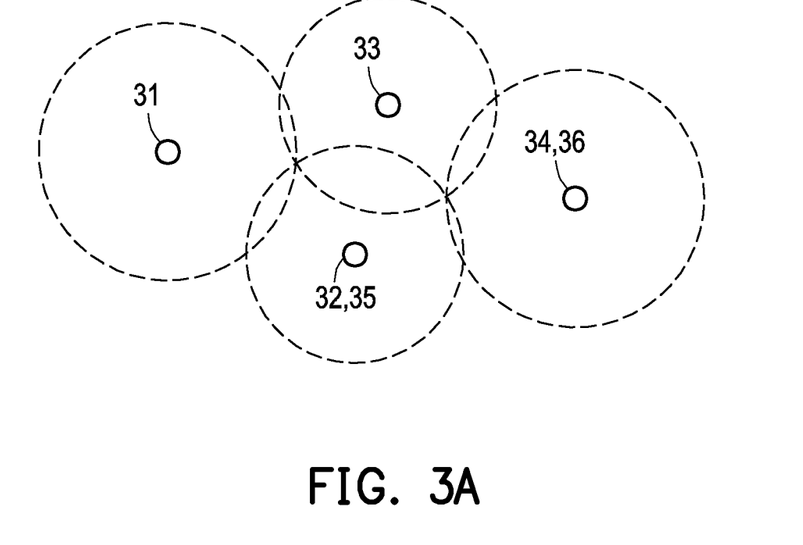
FIG. 3A is a schematic diagram of coverages of coverage radio units according to one embodiment of the disclosure.

In step S201, the module 121 may obtain information of a plurality of radio units from the hierarchical network via the transceiver 130. The information may at least include locations or coverages of the plurality of radio units, but the present disclosure is not limited thereto. For example, as shown in FIG. 3A, the module 121 may obtain locations or coverages of radio unit 31, 32, 33, and 34.

In step S202, the module 122 may determine a radio unit type for each of the plurality of radio units, wherein the radio unit type may include a coverage radio unit, a capacity radio unit, or a normal radio unit. A coverage radio unit may provide a basic signal coverage continuously, wherein the bandwidth allocated to the coverage radio unit may be narrower such that the bandwidth resources can be saved.

During the non-peak hours, a capacity radio unit may be turned off to save power. When the traffic of a coverage radio unit is too high, the capacity radio unit corresponding to the coverage radio may be turned on to offload the traffic for the coverage radio unit. Some UE served by the coverage radio units may handover to the corresponding capacity radio unit. If a radio unit is not selected as a coverage radio unit or a capacity radio unit, the radio unit may be classified as a normal radio unit. The normal radio unit may operate in a conventional manner, as specified in 3GPP specifications.

In the following embodiments, it is assumed that the plurality of radio units may include at least a first coverage radio unit (e.g., radio unit 32), a second coverage radio unit (e.g., radio unit 33), and a first capacity radio unit (e.g., radio unit 35) belonging to the first coverage radio unit. Furthermore, it is assumed that the information obtained by the module 122 may include at least a coverage of the second coverage radio unit and a coverage of the first capacity radio unit.

In one embodiment, the bandwidth of the second coverage radio unit is a bandwidth farthest from the bandwidth of the first coverage radio unit in a default bandwidth. For example, assuming that the default bandwidth is between 4800 MHZ to 4900 MHz. If the operating bandwidth of the first coverage radio unit (e.g., radio unit 32) includes 4800 MHZ, the operating bandwidth of the second coverage radio (e.g., radio unit 33) unit may include 4900 MHz such that the operating bandwidth of the second coverage radio unit is the bandwidth farthest from the bandwidth of the first coverage radio unit in the default bandwidth 4800 MHz to 4900 MHz.

In one embodiment, assuming that the plurality of radio units includes a first radio unit and a second radio unit, the module 122 may select the first radio unit from the plurality of radio units as the first coverage radio unit according to a reference distance of the first radio unit. Specifically, the module 122 may set a distance between the first radio unit and the second radio unit as the reference distance of the first radio unit in response to the second radio unit being a radio unit nearest to the first radio unit within the coverage of the first radio unit. For multiple radio units in a specific coverage (e.g., a coverage of one of the multiple radio units), the module 122 may select the first radio unit from the multiple radio units as the first coverage radio unit in response to the reference distance of the first radio unit being the smallest reference distance.

Figure 5A:
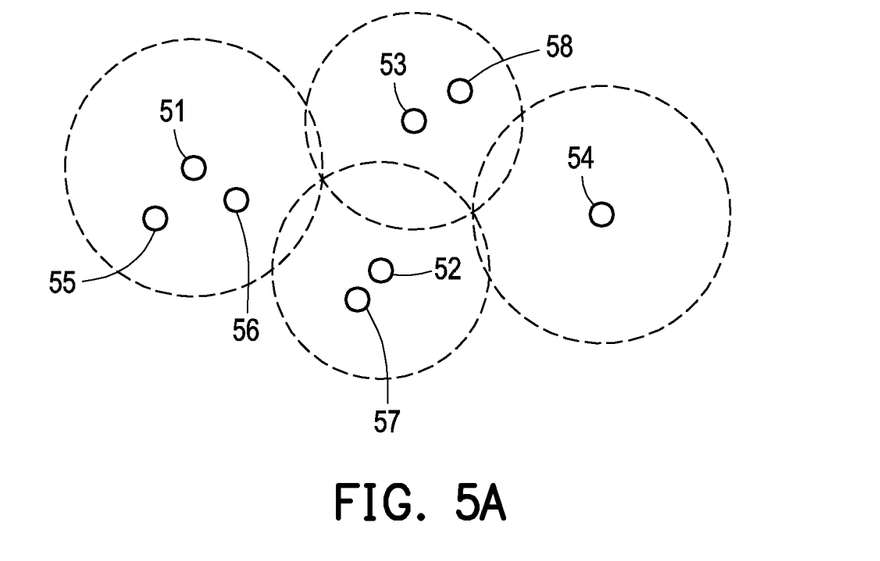
FIG. 5A is a schematic diagram of coverages of coverage radio units according to one embodiment of the disclosure.

For example, as shown in FIG. 5A, assuming that radio units 51, 55, and 56 are located within the coverage of each other. The module 122 may set the distance between the radio unit 51 and the radio unit 56 as the reference distance of the radio unit 51 in response to the radio unit 56 being a radio unit nearest to the radio unit 51 within the coverage of the radio unit 51. In similar manner, the module 122 may obtain information as represented in Table 1. For specific coverage (e.g., coverage of radio units 51, 55, or 56), the module 122 may select radio unit 51 (or radio unit 56) as the coverage radio unit for the specific coverage if distance "A" is less than distance "B" (i.e., distance "A" is the smallest reference distance in Table 1).

TABLE 1

| radio unit | reference distance for the radio unit |
|---|---|
| 51 | distance between radio units 51 and 56 (also referred to as distance "A") |
| 55 | distance between radio units 55 and 51 (also referred to as distance "B") |

TABLE 1-continued

| radio unit | reference distance for the radio unit |
|---|---|
| 56 | distance between radio units 51 and 56 (also referred to as distance "A") |

In one embodiment, assuming that the plurality of radio units includes a first radio unit and a second radio unit, the module 122 may select the first radio unit from the plurality of radio units as the first coverage radio unit according to a reference distance of the first radio unit. Specifically, the module 122 may set a distance between the first radio unit and the second radio unit as the reference distance of the first radio unit in response to the second radio unit being a radio unit farthest from the first radio unit within the coverage of the first radio unit. For multiple radio units in a specific coverage (e.g., a coverage of one of the multiple radio units), the module 122 may select the first radio unit from the multiple radio units as the first coverage radio unit in response to the reference distance of the first radio unit being the largest reference distance.

Figure 7A:
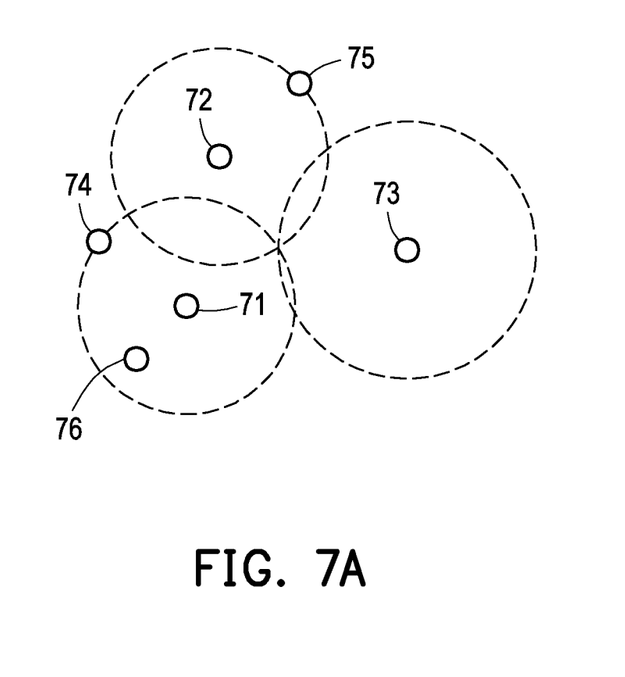
FIG. 7A is a schematic diagram of coverages of coverage radio units according to one embodiment of the disclosure.

For example, as shown in FIG. 7A, assuming that radio units 71, 74, and 76 are located within the coverage of each other. The module 122 may set the distance between the radio unit 71 and the radio unit 74 as the reference distance of the radio unit 71 in response to the radio unit 74 being a radio unit nearest to the radio unit 71 within the coverage of the radio unit 71. In similar manner, the module 122 may obtain information as represented in Table 2. For specific coverage (e.g., coverage of radio units 71, 74, or 76), the module 122 may select radio unit 71 (or radio unit 74) as the coverage radio unit for the specific coverage if distance "C" is greater than distance "D" (i.e., distance "C" is the largest reference distance in Table 2).

TABLE 2

| radio unit | reference distance for the radio unit |
|---|---|
| 71 | distance between radio units 71 and 74 (also referred to as distance "C") |
| 74 | distance between radio units 71 and 74 (also referred to as distance "C") |
| 76 | distance between radio units 74 and 76 (also referred to as distance "D") |

After determining the first coverage radio unit for a specific coverage, the module 122 may select a second radio unit from the plurality of radio units as the first capacity radio unit belonging to the first coverage radio unit in response to the second radio unit being in the coverage of the first coverage radio unit. For example, as shown in FIG. 7A, after determining the radio unit 71 as the coverage radio unit, the module 122 may select the radio units 74 and 76 as the capacity radio units belonging to the radio unit 71 in response to the radio units 74 and 76 being in the coverage of the radio unit 71.

Figure 3B:
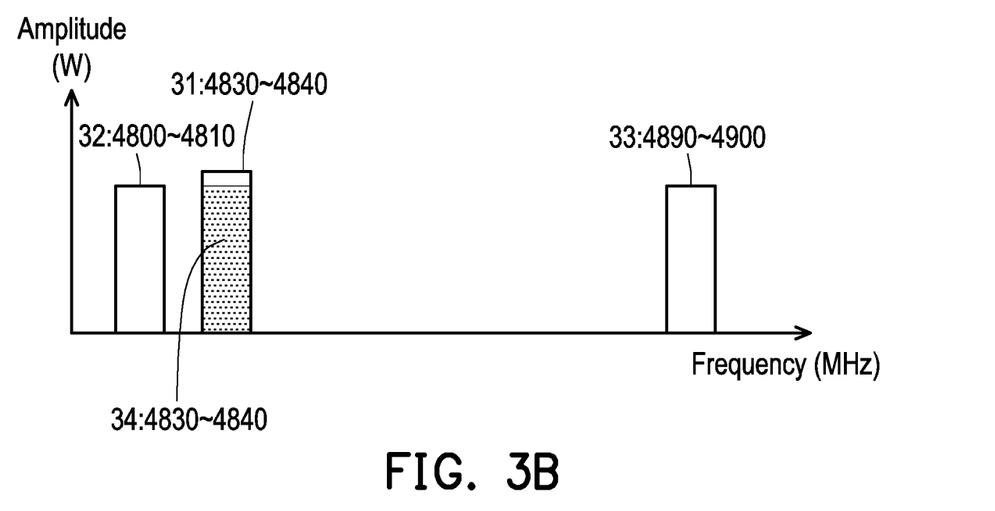
FIG. 3B is an amplitude-frequency plot of the coverage radio units in FIG. 3A according to one embodiment of the disclosure.

In step S203, the module 122 may turn on the first coverage radio unit (or the second coverage radio unit). Specifically, the module 122 may configured the first coverage radio unit (or the second coverage radio unit) to start performing registration process to the core network and providing network service for the UE within the coverage of the first coverage radio unit (or the second coverage radio unit). In one embodiment, the module 122 may configure the bandwidth of the second coverage radio unit such that the bandwidth of the second coverage radio unit may not overlapped with the bandwidth of the first coverage radio unit. For example, as shown in FIG. 3B, assuming that the radio unit 32 is the first coverage radio unit and the radio unit 33 is the second coverage radio unit. The module 122 may configure the bandwidth of the radio unit 33 such that the bandwidth of the radio unit 33 (i.e., 4890-4900 MHZ) may not overlapped with the bandwidth of the radio unit 32 (i.e., 4800-4810 MHz).

In one embodiment, the module 122 may configure the coverage radio unit to perform data transmission for both the control plane and the user plane of the hierarchical network.

In step S204, the module 121 may monitor the service state for each of the radio units and obtain information from each of the radio units. For example, the module 121 may obtain information such as traffic of the first coverage radio unit (e.g., radio unit 32), traffic of the second coverage radio unit (e.g., radio unit 33), or traffic of the first capacity radio unit (e.g., radio unit 35).

In step S205, the module 123 may determine whether the traffic of the first capacity radio unit is less or equal to a threshold. If the traffic of the first capacity radio unit is less than or equal to the threshold for a pre-configured time period, proceed to step S208. If the traffic of the first capacity radio unit is greater than the threshold after the preconfigured time period, proceed to step S206.

In step S206, the module 122 may determine whether the bandwidth or coverage of the first capacity radio unit is overlapped with the bandwidth or coverage of the second coverage radio unit. If the bandwidth of the first capacity radio unit is overlapped with the bandwidth of the second coverage radio unit and the coverage of the first capacity radio unit is overlapped with the coverage of the second coverage radio unit, proceed to step S207. If the bandwidth of the first capacity radio unit may not overlapped with the bandwidth of the second coverage radio unit or the coverage of the first capacity radio unit may not overlapped with the coverage of the second coverage radio unit, proceed to step S204.

In step S207, the module 122 may configured the first capacity radio unit via the transceiver 130. Specifically, the module 122 may reduce a power (e.g., transmission power) of the first capacity radio unit such that the second coverage radio unit would not be interfered by the first capacity radio unit.

In step S208, the module 122 may turn off the first capacity radio unit via the transceiver 130 so as to save power.

In step S209, the module 123 may determine whether the traffic of the first coverage radio unit is greater than a threshold. If the traffic of the first coverage radio unit is greater than the threshold, proceed to step S210. If the traffic of the first coverage radio unit is less than or equal to the threshold, proceed to step S204.

In step S210, the module 122 may determine whether the first capacity radio unit belonging to the first coverage radio unit is turned off. If the first capacity radio unit is turned off, proceed to step S211, If the first capacity radio unit is turned on, proceed to step S212.

In step S211, the module 122 may turn on the first capacity radio unit via the transceiver 130. Specifically, the module 122 may configure the bandwidth of the first capacity radio unit such that the bandwidth of the first capacity radio unit may not overlapped with the bandwidth of the first coverage radio unit. In one embodiment, the first capacity radio unit may support operation in a single bandwidth. That is, the first capacity radio unit cannot operate in two or more bandwidths in the same time.

In step S212, the module 123 may configure a UE to handover from the first coverage radio unit to the first capacity radio unit via the transceiver 130. In one embodiment, the module 122 may configure a beamforming parameter for the first capacity radio unit after the first capacity radio unit is turned on.

In one embodiment, the module 122 may configured the first capacity radio unit to perform data transmission for the control plane and the user plane of the hierarchical network.

FIG. 3A is a schematic diagram of coverages of coverage radio units according to one embodiment of the disclosure. FIG. 3B is an amplitude-frequency plot of the coverage radio units in FIG. 3A according to one embodiment of the disclosure. Referring to FIGS. 3A and 3B. it is assumed that radio units 31, 32, 33, and 34 are coverage radio units, the radio unit 35 is a capacity radio unit belonging to the radio unit 32, and the radio unit 36 is a capacity radio unit belonging to the radio unit 34. The radio unit 32 and the radio unit 35 belonging to the radio unit 32 may be located in the same position, and the radio unit 34 and the radio unit 36 belonging to the radio unit 34 may be located in the same position.

Assuming that the bandwidth of the radio unit 32 is configured to 4800-4810 MHz by the module 122. To configure the radio unit 33 whose coverage is overlapped with the radio unit 32, the module 122 may configure the bandwidth of radio unit 33 to 4890-4900 MHz such that the bandwidth of the radio unit 33 may not overlapped with the bandwidth of the radio unit 32. Furthermore, the module 122 may configure the bandwidth of the radio unit 33 to 4890-4900 MHz such that the bandwidth of the radio unit 33 may be a bandwidth farthest from the bandwidth (i.e., 4800-4810 MHz) of the radio unit 32 in the default bandwidth 4800-4900 MHz as shown in FIG. 3B. It should be noted that, the bandwidth of the radio unit 31 can be overlapped with the bandwidth of the radio unit 34 since the coverages of the radio units 31 and 34 are not overlapped with each other.

Figure 4A:
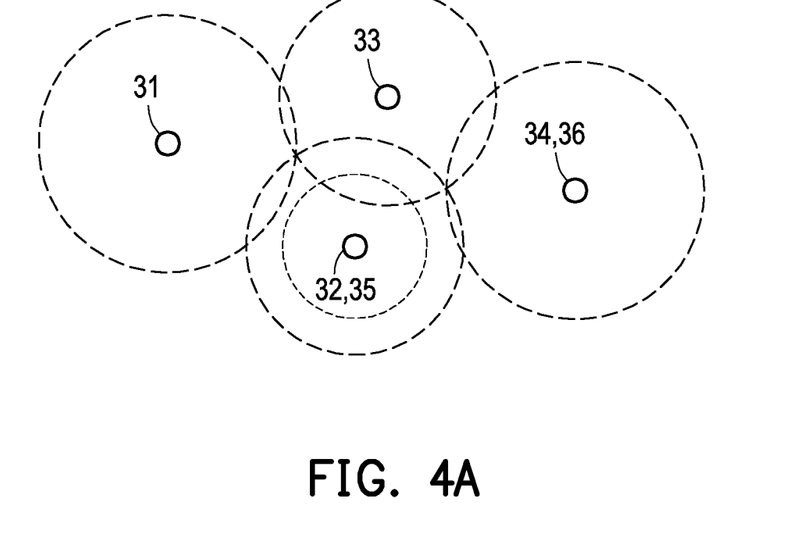
FIG. 4A is a schematic diagram of coverages of capacity radio units according to one embodiment of the disclosure.
Figure 4B:
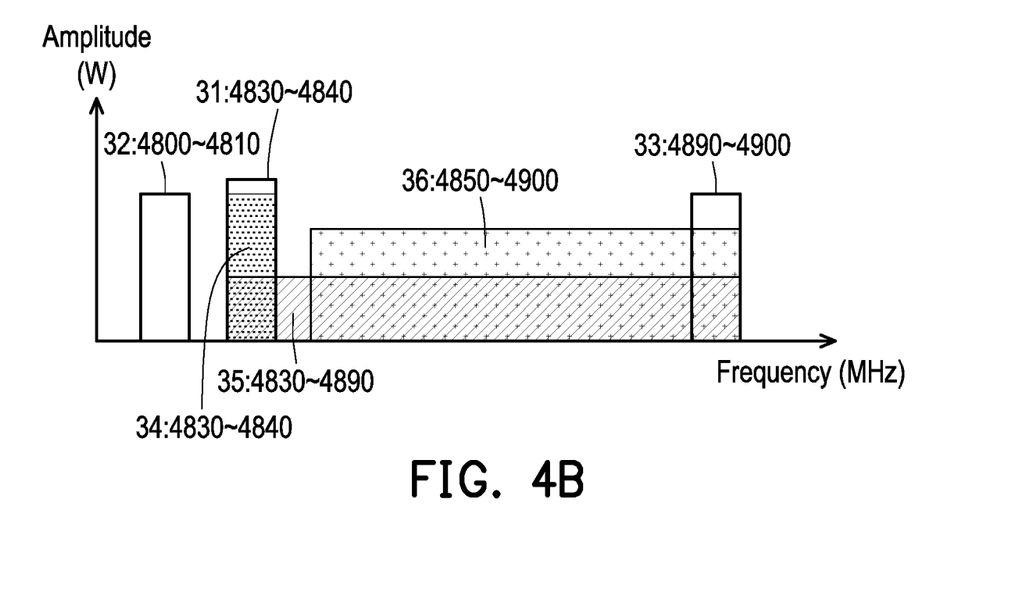
FIG. 4B is an amplitude-frequency plot of the capacity radio units in FIG. 4A according to one embodiment of the disclosure.

FIG. 4A is a schematic diagram of coverages of capacity radio units according to one embodiment of the disclosure. FIG. 4B is an amplitude-frequency plot of the capacity radio units in FIG. 4A according to one embodiment of the disclosure. Referring to FIGS. 4A and 4B, it is assumed that the radio units 31, 32, 33, and 34 are coverage radio units, the radio unit 35 is a capacity radio unit belonging to the radio unit 32, and the radio unit 36 is a capacity radio unit belonging to the radio unit 34. The radio unit 32 and the radio unit 35 belonging to the radio unit 32 may be located in the same position, and the radio unit 34 and the radio unit 36 belonging to the radio unit 34 may be located in the same position, wherein the coverage of the radio unit 35 may be smaller than the coverage of the radio unit 32, and the coverage of the radio unit 36 may be smaller than the coverage of the radio unit 34.

Taking the radio units 32 and 35 as an example, if the traffic of the radio unit 32 is greater than a threshold, the module 122 may turn on the radio unit 35. The module 123 may configure the UE served by the radio unit 32 to handover from the radio unit 32 to radio unit 35 so as to offload the traffic for the radio unit 32. The module 122 may configure the bandwidth of the radio unit 35 to 4830-4890 MHz such that the bandwidth of the radio unit 35 may not overlapped with the bandwidth (i.e., 4800-4810 MHz) of the radio unit 32.

Since the coverage of the radio unit 35 is overlapped with the coverage of the radio unit 33 and the bandwidth of the radio unit 35 is overlapped with the bandwidth (i.e., 4890-4900 MHZ) of the radio unit 33, the module 122 may reduce the power of the radio unit 35 such that the interference of the radio unit 35 to the radio unit 33 can be reduced. If the traffic of the radio unit 35 is less than a threshold for a pre-configured time period, the module 122 may turn off the radio unit 35 to save power.

Figure 5B:
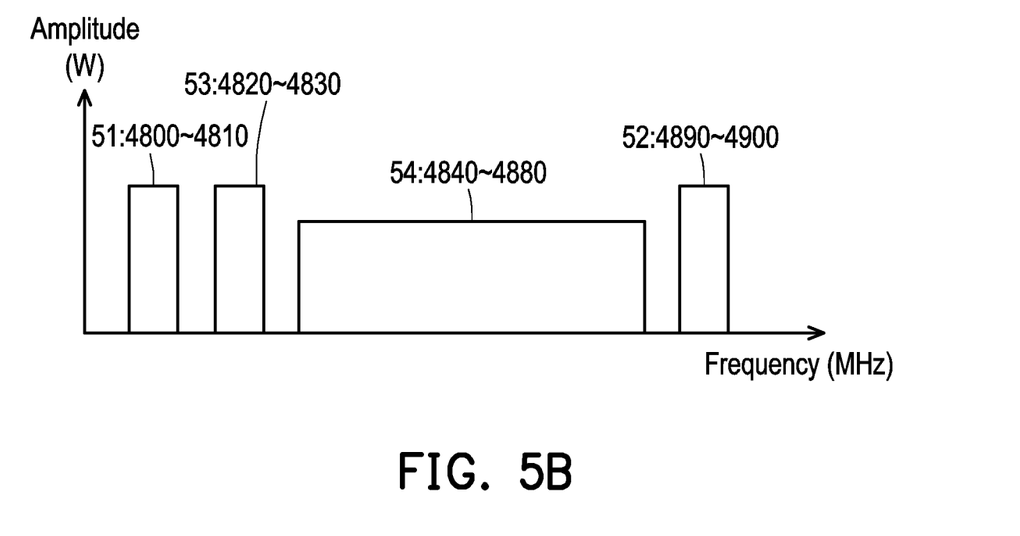
FIG. 5B is an amplitude-frequency plot of the coverage radio units in FIG. 5A according to one embodiment of the disclosure.

FIG. 5A is a schematic diagram of coverages of coverage radio units according to one embodiment of the disclosure. FIG. 5B is an amplitude-frequency plot of the coverage radio units in FIG. 5A according to one embodiment of the disclosure. Referring to FIGS. 5A and 5B, the module 121 may obtain information including locations and coverages of the radio units 51, 52, 53, 54, 55, 56, 57, and 58. The module 122 may determine a radio unit type for each of the radio units. Taking radio unit 51 as an example, the module 122 may select the radio unit 51 from the plurality of radio units as a coverage radio unit according to a reference distance of the radio unit 51. In one embodiment, the module 122 may set a distance between the radio unit 51 and radio unit 56 as the reference distance of the radio unit 51 in response to the radio unit 56 being a radio unit nearest to the radio unit 51 within the coverage of the radio unit 51. Accordingly, the module 122 may obtain information as represented in Table 1. The module 122 may select the radio unit 51 as a coverage radio unit according to Table 1. In similar manner, the module 122 may further select the radio units 52, 53, and 54 as coverage radio units.

After the coverage radio units are determined, the module 122 may select the radio units 55 and 56 as the capacity radio units belonging to the radio unit 51 in response to the radio units 55 and 56 being in the coverage of the radio unit 51. In similar manner, the module 122 may select the radio unit 57 as the capacity radio unit belonging to the radio unit 52, and may select the radio unit 58 as the capacity radio unit belonging to the radio unit 53, wherein the coverage of the radio unit 57 may be smaller than the coverage of the radio unit 52, and the coverage of the radio unit 58 may be smaller than the coverage of the radio unit 53.

If a specific radio unit is not located in any coverage of the radio units, and no radio unit is located in a coverage of the specific radio unit, the module 122 may select the specific radio unit as a normal radio unit. For example, since the radio unit 54 is not located in any coverage of the radio units and no radio unit is located in the coverage of the radio unit 54, the module 122 may select the radio unit 54 as a normal radio unit.

After the radio unit type for each radio unit being determined, the module 122 may configure each coverage radio unit. Assuming that the bandwidth of the radio unit 51 is configured to 4800-4810 MHz by the module 122. To configure the radio unit 52 whose coverage is overlapped with the radio unit 51, the module 122 may configure the bandwidth of the radio unit 52 to 4890-4900 MHz such that the bandwidth of the radio unit 52 may not overlapped with the bandwidth of the radio unit 51. Furthermore, the module 122 may configure the bandwidth of the radio unit 52 to 4890-4900 MHz such that the bandwidth of the radio unit 52 may be a bandwidth farthest from the bandwidth (i.e., 4800-4810 MHz) of the radio unit 51 in the default bandwidth 4800-4900 MHz as shown in FIG. 5B.

Figure 6A:
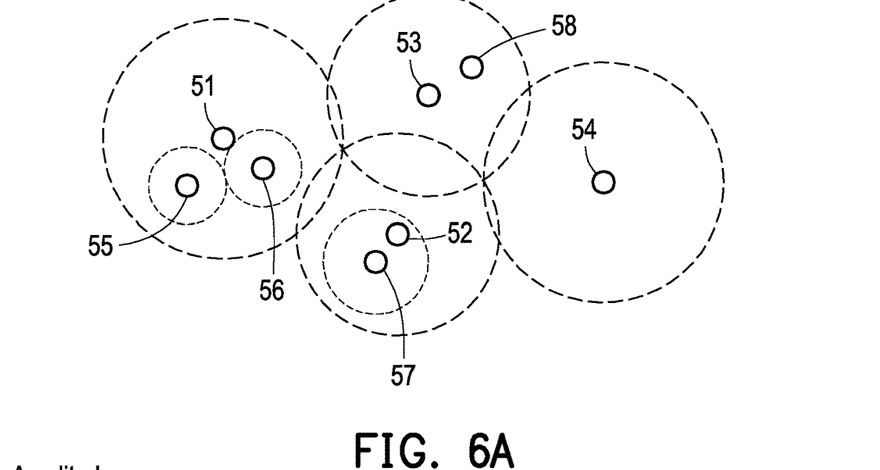
FIG. 6A is a schematic diagram of coverages of capacity radio units according to one embodiment of the disclosure.
Figure 6B:
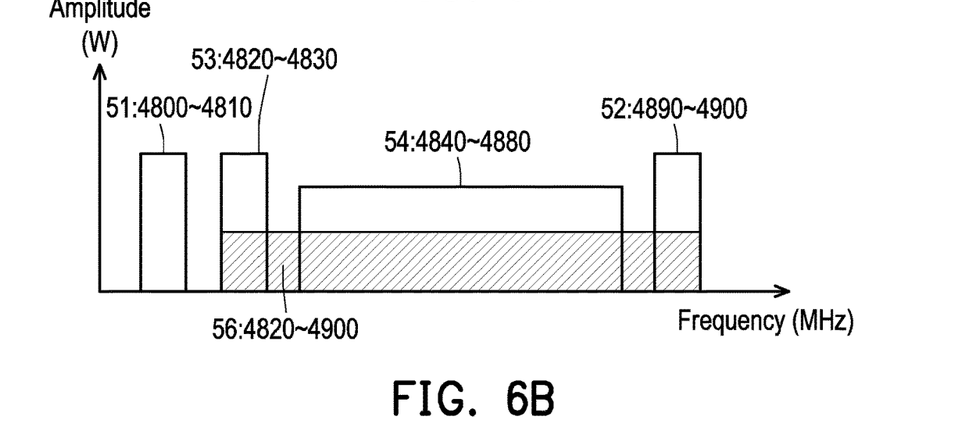
FIGS. 6B and 6C are amplitude-frequency plots of the capacity radio units in FIG. 6A according to one embodiment of the disclosure.
Figure 6C:
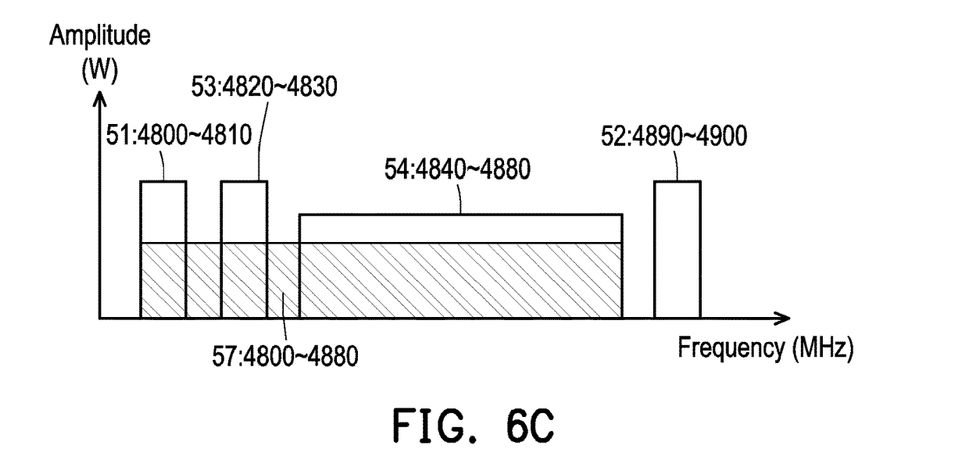

FIG. 6A is a schematic diagram of coverages of capacity radio units according to one embodiment of the disclosure. FIGS. 6B and 6C are amplitude-frequency plots of the capacity radio units in FIG. 6A according to one embodiment of the disclosure. Referring to FIGS. 6A, 6B, and 6C, it is assumed that the radio units 51, 52, 53, and 54 are coverage radio units, the radio units 55 and 56 are capacity radio units belonging to the radio unit 51, the radio unit 57 is the capacity radio unit belonging to the radio unit 52, the radio unit 58 is a capacity radio unit belonging to the radio unit 53, and the radio unit 54 is a normal radio unit, wherein the coverage of the radio unit 55 or radio unit 56 may be smaller than the coverage of the radio unit 51, the coverage of the radio unit 57 may be smaller than the coverage of the radio unit 52, and the coverage of the radio unit 58 may be smaller than the coverage of the radio unit 53.

Taking the radio units 51, 55, and 56 as an example, if the traffic of the radio unit 51 is greater than a threshold, the module 122 may turn on the radio unit 55 or radio unit 56. The module 123 may configure the UE served by the radio unit 51 to handover from the radio unit 51 to the radio unit 55 or radio unit 56 so as to offload the traffic for the radio unit 51. The module 122 may configure the bandwidth of the radio unit 56 (or radio unit 55) to 4820-4900 MHz such that the bandwidth of the radio unit 56 may not overlapped with the bandwidth (i.e., 4800-4810 MHz) of the radio unit 51. Taking the radio units 52 and 57 as another example, if the traffic of the radio unit 52 is greater than a threshold, the module 122 may turn on the radio unit 57. The module 123 may configure the UE served by the radio unit 52 to handover from the radio unit 52 to the radio unit 57 so as to offload the traffic for the radio unit 52. The module 122 may configure the bandwidth of the radio unit 57 to 4800-4880 MHz such that the bandwidth of the radio unit 57 may not overlapped with the bandwidth (i.e., 4890-4900 MHz) of the radio unit 52.

Since the coverage of the radio unit 56 is overlapped with the coverage of the radio unit 52 and the bandwidth (i.e., 4820-4900 MHZ) of the radio unit 56 is overlapped with the bandwidth (i.e., 4890-4900 MHZ) of the radio unit 52, the module 122 may reduce the power of the radio unit 56 such that the interference of the radio unit 56 to the radio unit 52 can be reduced. If the traffic of the radio unit 56 is less than a threshold for a pre-configured time period, the module 122 may turn off the radio unit 56 to save power.

Figure 7B:
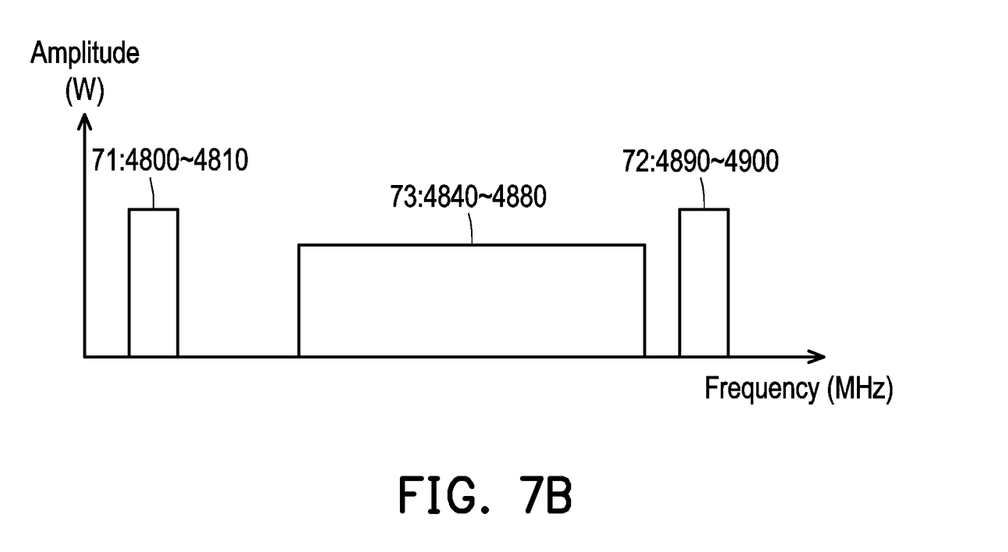
FIG. 7B is an amplitude-frequency plot of the coverage radio units in FIG. 7A according to one embodiment of the disclosure.

FIG. 7A is a schematic diagram of coverages of coverage radio units according to one embodiment of the disclosure. FIG. 7B is an amplitude-frequency plot of the coverage radio units in FIG. 7A according to one embodiment of the disclosure. Referring to FIGS. 5A and 5B, the module 121 may obtain information including locations and coverages of the radio units 71, 72, 73, 74, 75, and 76. The module 122 may determine a radio unit type for each of the radio units. Taking radio unit 71 as an example, the module 122 may select the radio unit 71 from the plurality of radio units as a coverage radio unit according to a reference distance of the radio unit 71. In one embodiment, the module 122 may set a distance between the radio unit 71 and radio unit 74 as the reference distance of the radio unit 71 in response to the radio unit 74 being a radio unit farthest from the radio unit 71 within the coverage of the radio unit 71. Accordingly, the module may obtain information as represented in Table 2. The module 122 may select the radio unit 71 as a coverage radio unit according to Table 2. In similar manner, the module 122 may further select the radio units 72 and 73 as coverage radio units.

After the coverage radio units are determined, the module 122 may select the radio units 74 and 76 as the capacity radio units belonging to the radio unit 71 in response to the radio units 74 and 76 being in the coverage of the radio unit 71. In similar manner, the module 122 may select the radio unit 75 as the capacity radio unit belonging to the radio unit 72.

If a specific radio unit is not located in any coverage of the radio units, and no radio unit is located in a coverage of the specific radio unit, the module 122 may select the specific radio unit as a normal radio unit. For example, since the radio unit 73 is not located in any coverage of the radio units and no radio unit is located in the coverage of the radio unit 73, the module 122 may select the radio unit 73 as a normal radio unit.

After the radio unit type for each radio unit being determined, the module 122 may configure each coverage radio unit. Assuming that the bandwidth of the radio unit 71 is configured to 4800-4810 MHz by the module 122. To configure the radio unit 72 whose coverage is overlapped with the radio unit 71, the module 122 may configure the bandwidth of the radio unit 72 to 4890-4900 MHz such that the bandwidth of the radio unit 72 may not overlapped with the bandwidth of the radio unit 71. Furthermore, the module 122 may configure the bandwidth of the radio unit 72 to 4890-4900 MHz such that the bandwidth of the radio unit 72 may be a bandwidth farthest from the bandwidth (i.e., 4800-4810 MHz) of the radio unit 71 in the default bandwidth 4800-4900 MHz as shown in FIG. 7B.

Figure 8A:
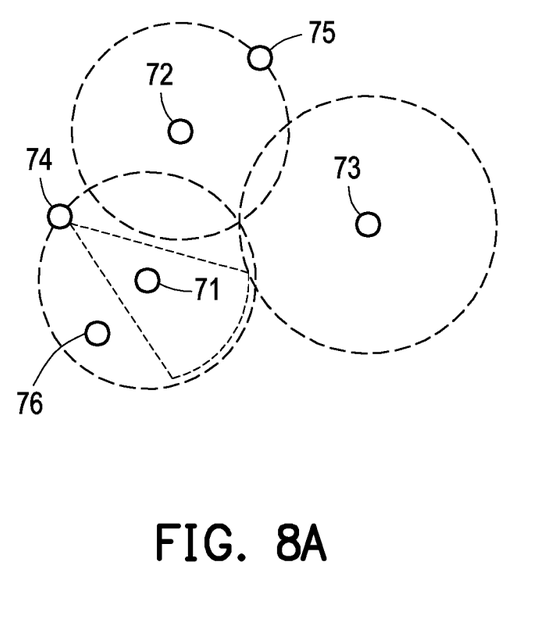
FIG. 8A is a schematic diagram of coverages of capacity radio units according to one embodiment of the disclosure.
Figure 8B:
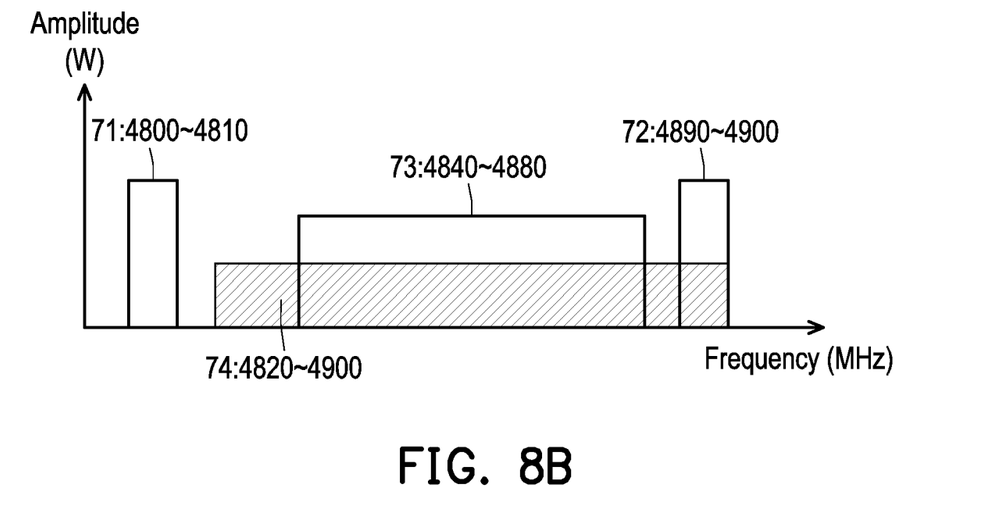
FIG. 8B is an amplitude-frequency plot of the capacity radio units in FIG. 8A according to one embodiment of the disclosure.

FIG. 8A is a schematic diagram of coverages of capacity radio units according to one embodiment of the disclosure. FIG. 8B is an amplitude-frequency plot of the capacity radio units in FIG. 8A according to one embodiment of the disclosure. Referring to FIGS. 8A and 8B, it is assumed that the radio units 71, 72, and 73 are coverage radio units, the radio units 74 and 76 are capacity radio units belonging to the radio unit 71, the radio unit 75 is a capacity radio unit belonging to the radio unit 72, and the radio unit 73 is a normal radio unit.

Taking the radio units 71 and 74 as an example, if the traffic of the radio unit 71 is greater than a threshold, the module 122 may turn on the radio unit 74. The module 123 may configure the UE served by the radio unit 71 to handover from the radio unit 71 to the radio unit 74 so as to offload the traffic for the radio unit 71. The module 122 may configure the bandwidth of the radio unit 74 to 4820-4900 MHz such that the bandwidth of the radio unit 74 may not overlapped with the bandwidth (i.e., 4800-4810 MHz) of the radio unit 71. In one embodiment, the module 122 may configure a beamforming parameter for the radio unit 74 via the transceiver 130 in response to the radio unit 74 being turned on.

Since the coverage of the radio unit 74 is overlapped with the coverage of the radio unit 73 and the bandwidth (i.e., 4820-4900 MHZ) of the radio unit 74 is overlapped with the bandwidth (i.e., 4840-4880 MHz) of the radio unit 73, the module 122 may reduce the power of the radio unit 74 such that the interference of the radio unit 74 to the radio unit 73 can be reduced. If the traffic of the radio unit 74 is less than a threshold for a pre-configured time period, the module 122 may turn off the radio unit 74 to save power.

Figure 9:
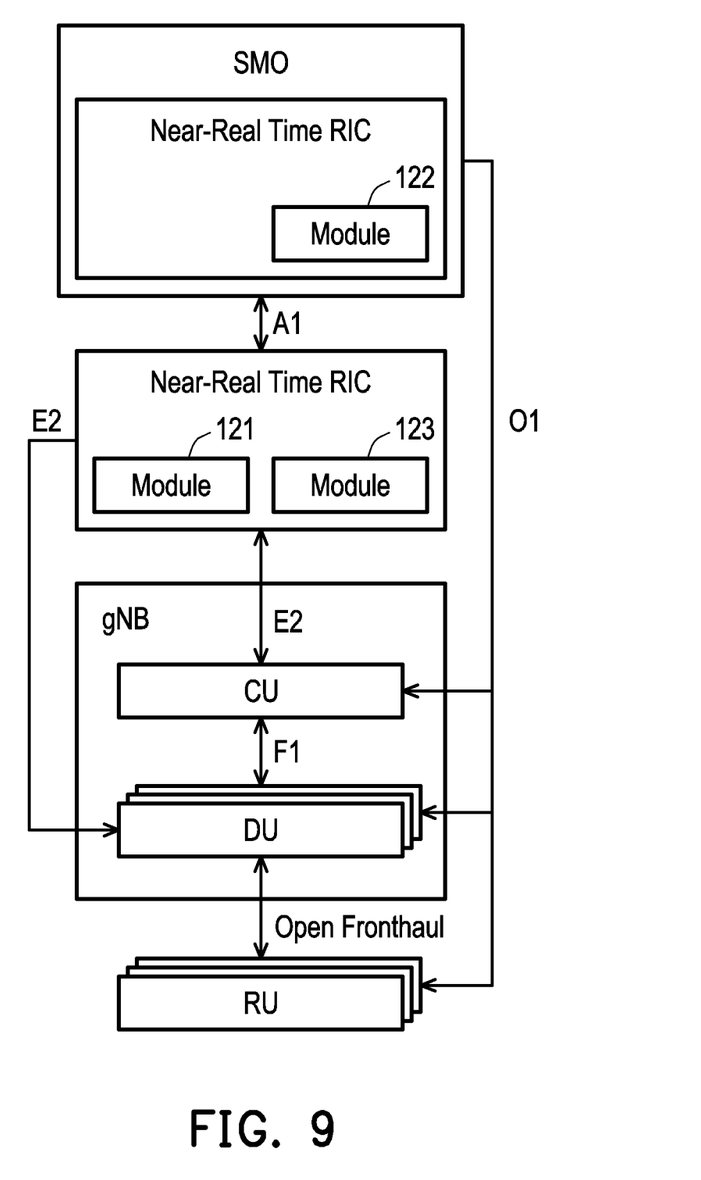
FIG. 9 is a schematic diagram of an open radio access network (O-RAN) architecture according to one embodiment of the disclosure.

FIG. 9 is a schematic diagram of an open radio access network (O-RAN) architecture according to one embodiment of the disclosure, wherein the O-RAN architecture may include a service management and orchestration (SMO) component, near-real-time RAN intelligent controllers (RIC), a central unit (CU) in the gNB, one or more distributed units (DU) in the gNB, and one or more radio units (RU). In one embodiment, the module 122 may be implemented in the near-real-time RIC in the SMO component, and the modules 121 and 123 may be implemented in the near-real-time RIC coupled between the SMO component and the gNB. The detail information of the O-RAN architecture can be represented by Table 3.

TABLE 3

| module | function | interface | target | protocol | message format |
|---|---|---|---|---|---|
| 122 | network topology management | O1 | CU, DU, RU | Netconf/ REST | O1-interface data models |
|  | bandwidth allocation | O1 |  |  |  |
|  | switching of power saving mode | O1 |  |  |  |
| 121 | collection of traffic data from RAN | E2 | CU, DU | E2AP | E2SM-RC: E2 report, E2SM-KPM |
|  |  | A1 | Non-real-time RIC | A1AP | A1TD |
| 123 | UE traffic analysis; handover parameter configuration | E2 | CU, DU | E2AP | E2SM-RC: E2 report, E2 control |

Figure 10:
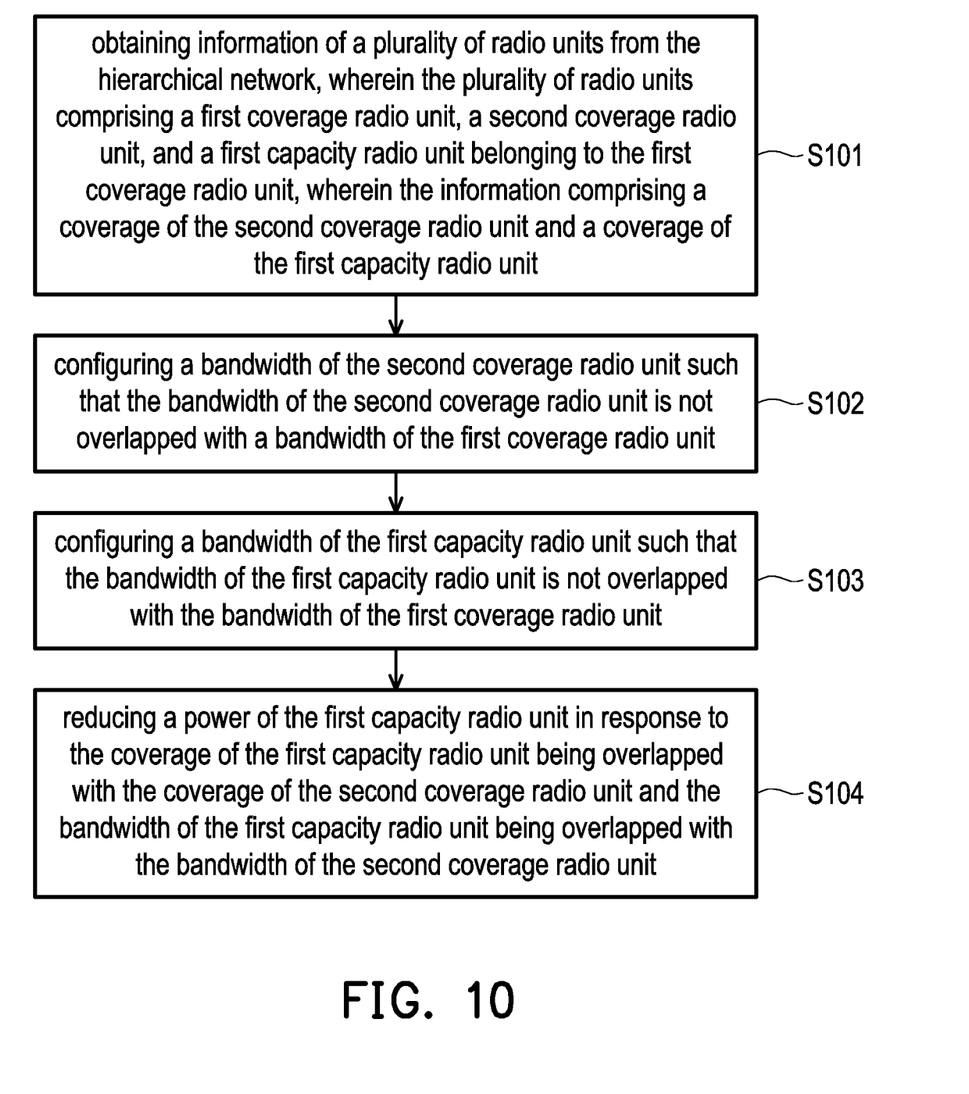
FIG. 10 is a flowchart of a method for configuring radio units in a hierarchical network according to one embodiment of the disclosure.

FIG. 10 is a flowchart of a method for configuring radio units in a hierarchical network according to one embodiment of the disclosure, wherein the method can be implemented by the electronic device 100 as shown in FIG. 1. In step S101, obtaining information of a plurality of radio units from the hierarchical network, wherein the plurality of radio units comprising a first coverage radio unit, a second coverage radio unit, and a first capacity radio unit belonging to the first coverage radio unit, wherein the information comprising a coverage of the second coverage radio unit and a coverage of the first capacity radio unit. In step S102, configuring a bandwidth of the second coverage radio unit such that the bandwidth of the second coverage radio unit is not overlapped with a bandwidth of the first coverage radio unit. In step S103, configuring a bandwidth of the first capacity radio unit such that the bandwidth of the first capacity radio unit is not overlapped with the bandwidth of the first coverage radio unit. In step S104, reducing a power of the first capacity radio unit in response to the coverage of the first capacity radio unit being overlapped with the coverage of the second coverage radio unit and the bandwidth of the first capacity radio unit being overlapped with the bandwidth of the second coverage radio unit.

In view of the aforementioned description, the electronic device in the present invention may determine a type for each of the radio units in a field according to the coverages of the radio units or the distances among the radio units, wherein different types of radio units may operate in different ways. When the network traffic is low, the electronic device may configure only a few coverage radio units to serve the whole field. On the other hand, when the network traffic is high, the electronic device may turn on a capacity radio unit for the coverage radio unit to offload the network traffic for the coverage radio unit. The electronic device may configure the power or beamforming parameter of a capacity radio unit if the operating bandwidth or the coverage of the capacity radio unit interferes a coverage radio unit. Accordingly, the disclosure provides a power saving mechanism for the hierarchical network which can guarantee the signal coverage and QoS of the network regardless the capacity radio unit is turned on or turned off.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device for configuring radio units in a hierarchical network, comprising:
   a transceiver;
   a storage medium storing a plurality of modules; and
   a processor coupled to the storage medium and the transceiver, wherein the processor accesses and executes the plurality of modules, wherein the plurality of modules comprising:
      a first module, obtaining information of a plurality of radio units from the hierarchical network via the transceiver, wherein the plurality of radio units comprising a first coverage radio unit, a second coverage radio unit, and a first capacity radio unit belonging to the first coverage radio unit, wherein the information comprising a coverage of the second coverage radio unit and a coverage of the first capacity radio unit; and
      a second module, configuring a bandwidth of the second coverage radio unit such that the bandwidth of the second coverage radio unit is not overlapped with a bandwidth of the first coverage radio unit, and configuring a bandwidth of the first capacity radio unit such that the bandwidth of the first capacity radio unit is not overlapped with the bandwidth of the first coverage radio unit, wherein
   the second module reduce a power of the first capacity radio unit in response to the coverage of the first capacity radio unit being overlapped with the coverage of the second coverage radio unit and the bandwidth of the first capacity radio unit being overlapped with the bandwidth of the second coverage radio unit.

2. The electronic device of claim 1, wherein the bandwidth of the second coverage radio unit is a bandwidth farthest from the bandwidth of the first coverage radio unit in a default bandwidth.

3. The electronic device of claim 1, wherein the second module selects a first radio unit from the plurality of radio units as the first coverage radio unit according to a reference distance of the first radio unit.

4. The electronic device of claim 3, wherein the second module sets a distance between the first radio unit and a second radio unit as the reference distance of the first radio unit in response to the second radio unit being a radio unit nearest to the first radio unit within a coverage of the first radio unit.

5. The electronic device of claim 3, wherein the second module sets a distance between the first radio unit and a second radio unit as the reference distance of the first radio unit in response to the second radio unit being a radio unit farthest from the first radio unit within a coverage of the first radio unit.

6. The electronic device of claim 3, wherein the second module selects a second radio unit from the plurality of radio units as the first capacity radio unit in response to the second radio unit being in the coverage of the first coverage radio unit.

7. The electronic device of claim 1, wherein the information further comprising traffic of the first coverage unit, wherein the second module configuring a beamforming parameter for the first capacity radio unit via the transceiver in response to the traffic of the first capacity radio unit being greater than a threshold.

8. The electronic device of claim 1, wherein the information further comprising traffic of the first coverage radio unit, wherein the second module turns on the first capacity radio unit via the transceiver in response to the traffic of the first coverage radio unit being greater than a threshold.

9. The electronic device of claim 8, wherein the plurality of modules further comprising:
   a third module, configuring a user equipment to handover from the first coverage radio unit to the first capacity radio unit via the transceiver in response to the first capacity radio unit being turned on.

10. The electronic device of claim 1, wherein the information further comprising traffic of the first capacity radio unit, wherein the second module turns off the first capacity radio unit via the transceiver in response to the traffic of the first capacity radio unit being less than or equal to a threshold.

11. The electronic device of claim 1, wherein the first coverage radio unit and the first capacity radio unit are located in the same position.

12. The electronic device of claim 1, wherein the second module configures the first coverage radio unit to perform data transmission for a control plane and a user plane of the hierarchical network.

13. The electronic device of claim 1, wherein the second module configures the first capacity radio unit to perform data transmission for a control plane and a user plane of the hierarchical network.

14. The electronic device of claim 1, wherein the first capacity radio unit supports operation in a single bandwidth.

15. A method for configuring radio units in a hierarchical network, comprising:
   obtaining information of a plurality of radio units from the hierarchical network, wherein the plurality of radio units comprising a first coverage radio unit, a second coverage radio unit, and a first capacity radio unit belonging to the first coverage radio unit, wherein the information comprising a coverage of the second coverage radio unit and a coverage of the first capacity radio unit;
   configuring a bandwidth of the second coverage radio unit such that the bandwidth of the second coverage radio unit is not overlapped with a bandwidth of the first coverage radio unit;
   configuring a bandwidth of the first capacity radio unit such that the bandwidth of the first capacity radio unit is not overlapped with the bandwidth of the first coverage radio unit; and
   reducing a power of the first capacity radio unit in response to the coverage of the first capacity radio unit being overlapped with the coverage of the second coverage radio unit and the bandwidth of the first capacity radio unit being overlapped with the bandwidth of the second coverage radio unit.

* * * * *